United States Patent
Lagares Corominas

(10) Patent No.: US 7,182,224 B2
(45) Date of Patent: Feb. 27, 2007

(54) DEVICE FOR PORTIONING FLOWABLE FOOD PRODUCTS

(75) Inventor: Narcis Lagares Corominas, Girona (ES)

(73) Assignee: Metalquimia, S.A., Girona (ES)

( * ) Notice: Subject to any disclaimer, the term of this patent is extended or adjusted under 35 U.S.C. 154(b) by 340 days.

(21) Appl. No.: 10/505,920

(22) PCT Filed: Feb. 28, 2002

(86) PCT No.: PCT/ES02/00091

§ 371 (c)(1),
(2), (4) Date: Aug. 27, 2004

(87) PCT Pub. No.: WO03/072437

PCT Pub. Date: Sep. 4, 2003

(65) Prior Publication Data

US 2005/0218158 A1    Oct. 6, 2005

(51) Int. Cl.
*B67D 5/52* (2006.01)
*B65B 1/04* (2006.01)

(52) U.S. Cl. .................. 222/255; 222/265; 222/267; 222/275; 141/99; 141/258; 141/261

(58) Field of Classification Search .............. 222/255, 222/265, 267, 275, 278, 280; 141/99, 248, 141/258, 261
See application file for complete search history.

(56) References Cited

U.S. PATENT DOCUMENTS

| | | | | |
|---|---|---|---|---|
| 3,851,798 | A | * | 12/1974 | Miller ..................... 222/135 |
| 4,693,397 | A | * | 9/1987 | Lang ...................... 222/137 |
| 4,767,031 | A | * | 8/1988 | Proepper ................ 222/255 |
| 4,913,202 | A | | 4/1990 | Miller et al. |
| 5,014,882 | A | | 5/1991 | Dennis et al. |
| 5,029,735 | A | | 7/1991 | Dennis et al. |
| 5,479,847 | A | | 1/1996 | Powers et al. |

(Continued)

FOREIGN PATENT DOCUMENTS

EP    1090840    4/2001

(Continued)

OTHER PUBLICATIONS

International Search Report for PCT International Patent Application No. PCT/ES 02/00091 mailed Dec. 18, 2002.

*Primary Examiner*—Kevin Shaver
*Assistant Examiner*—Stephanie E. Tyler
(74) *Attorney, Agent, or Firm*—RatnerPrestia

(57) ABSTRACT

The invention relates to a device for portioning flowable food products, consisting of: a first group of cylinders (1) comprising pistons (3) which communicate with a chamber (5) having an inlet (5*a*) and an outlet (5*b*); a second group of cylinders (2) comprising pistons (4) which communicate with a chamber (6) having an inlet (6*a*) and an outlet (6*b*), and dispensing means. Said dispensing means are controlled by synchronisation and control means in order to: alternately communicate a food product inlet (9) with said chamber (5) whereby the cylinders (1) open the inlet (5*a*) and close the outlet (5*b*) thereof; and simultaneously communicate an outlet (10) with said chamber (8) whereby the cylinders (2) close the inlet (56*a*) and open the outlet (6*b*) thereof and vice versa. Fluid dynamic cylinders (26) actuate each piston (3, 4) consecutively or actuate on sub-groups of pistons (3, 4) consecutively in order to empty the cylinders (1, 2).

18 Claims, 8 Drawing Sheets

U.S. PATENT DOCUMENTS 6,334,473 B1 * 1/2002 Dumargue .................. 141/144
6,360,920 B1    3/2002 Corominas

FOREIGN PATENT DOCUMENTS

| ES | 2019642 B3 | 7/1991 |
| ES | 2157142 A1 | 8/2001 |
| ES | 2157143 A1 | 8/2001 |
| WO | WO 90/14578 A1 | 11/1990 |
| WO | WO 99/62766 | 12/1999 |
| WO | WO 01/87710 A1 | 11/2001 |

* cited by examiner

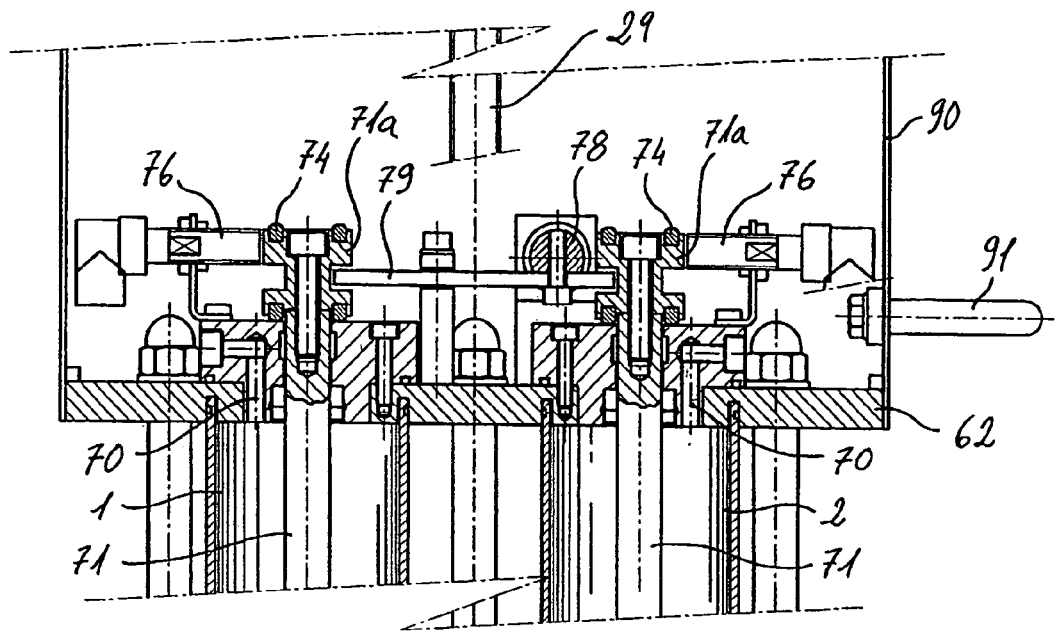
Fig. 7
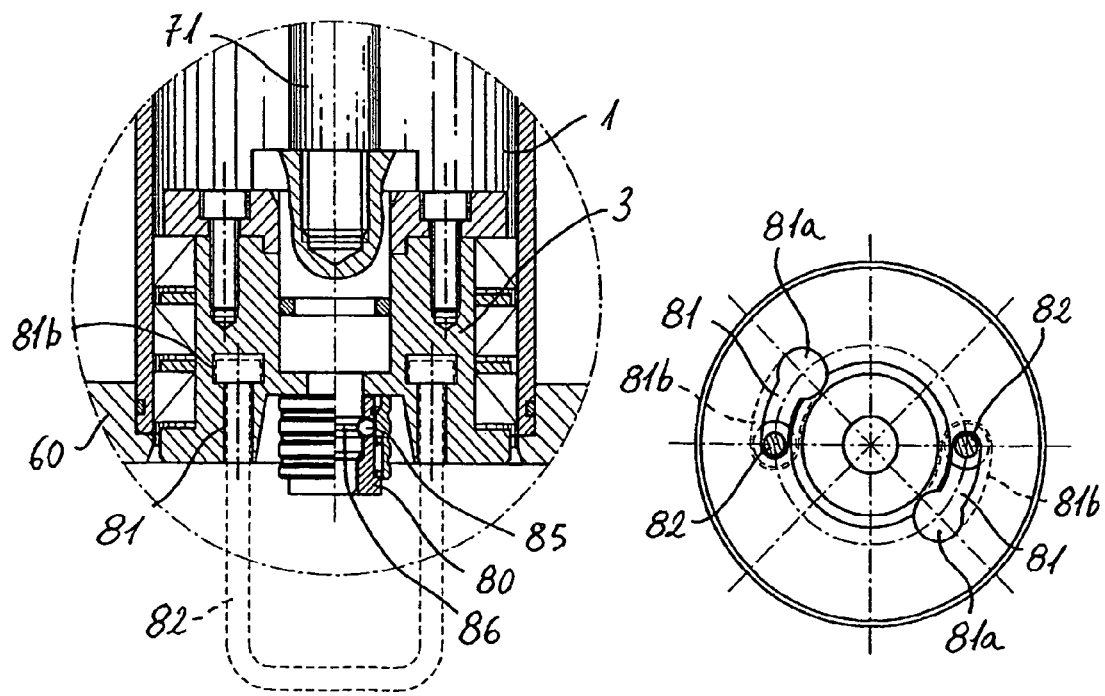
Fig. 8
Fig. 9

DEVICE FOR PORTIONING FLOWABLE FOOD PRODUCTS

This application is a U.S. National Phase Application of PCT International Application PCT/ES02/00091.

FIELD OF THE INVENTION

This invention relates to a device for portioning flowable meat and other food products such as chopped meat or meat cut into pieces, bread or pastry dough, etc. provided with means for adjusting the size of the portions and capable to have a high production speed and provided in addition with means to make its cleaning easier.

This invention is useful in the food industry field, namely in the field of the industry for producing portions of food product such as meat industry, pork butchery, breadmaking, pastry production, etc.

TECHNICAL BACKGROUND

In the technique of the sector devices are already known for preparing portions of meat and other flowable food product based on the arrangement of two cylinders provided with pistons and means for alternately communicating one of the said cylinders with an inlet for the said meat or other flowable food product and the other of the said cylinders having an outlet for expelling a portion of food product and vice versa. The incoming product is driven by a pump and when it is entering in the related cylinder it moves the respective piston a determined length depending on the size of the portions to be obtained. Effectively, the size of the portion is equivalent to the volume of a stroke of the piston, that is to say, the volume which results from multiplying the internal surface of the cylinder cross section by the length of the piston working stroke. To expel the portion food product from the cylinder, the piston is driven in the opposite direction by means of a fluid dynamic drive. To delimit the said working stroke of the said pistons, means having adjustable stops are provided for moving the piston rods, in order to accurately determine this way the size of the said portions.

U.S. Pat. No. 5,029,735 by Wendell E. Dennis, filed on 20 Sep. 1989, discloses a device of this kind, also called a "turret", in which two of the said cylinders (although it could be only one) are mounted in raised position on an assembly which can be alternately rotated in a predetermined angle, concretely 90°, in both directions to successively face the entrances of both cylinders with two inlet ducts and two outlet ducts. To make its cleaning inside the cylinders and the inlet and outlet ducts easier, a fluid dynamic device of cylinder and piston lifts the whole assembly in which portioning cylinders are mounted leaving free the entrances thereof and the entrances of the said ducts associated to them, for cleaning. However, such arrangement makes necessary a nonstop angular stroke of the whole cylinder assembly, which carries unwanted dynamic effects and a high power consumption. The existence of only one or two portioning cylinders makes the production speed relatively low. In addition, the separation provided by the lifting device between the cylinder entrances and the inlet and outlet entrances of the ducts results insufficient to carry out a thorough and easy cleaning thereof.

WO 99/62766 of this applicant filed on 3 Jun. 1999 prior to a Spanish patent of 4 Jun. 1998, discloses a volumetric dosing device for pasty product for filling a canning line by thermoforming comprising at least a dosing cylinder, preferably two dosing cylinders, of above described kind, arranged parallel to each other raised at a static location, with its entrances at the lower part. The said entrances communicate with openings located on a cylindric wall of a hollow housing, arranged under the said dosing cylinders, for a valve body or chest which is driven to tightly rotate a given angle within the said housing, alternately in both directions. The said cylindric housing comprises an inlet of pasty product at an axial end thereof, and two outlets are arranged on its cylindric wall, at a substantially radial position, facing the said entrances of the dosing cylinders. On the other hand, the said valve chest is formed by a cylindric block provided on its periphery with a slotting extending in a generating line direction communicating through a passageway with an inlet opening at an axial end of the valve chest. Through holes fully cross the said bloc in a substantially radial direction without interfering with the said slotting. At a first angular position, the said valve chest alternately communicates the said inlet of pasty product with the entrances of the dosing cylinders through the said slotting and then, at a second angular position, the said entrances of the dosing cylinders with the said through holes. The assembly of dosing cylinders, with their related means to adjust the stroke of their pistons can be tilted with respect to the cylindric housing for cleaning the interior of the dosing cylinders and in addition, the said housing had an opening with an openable cover on its free axial end through which the valve chest can be withdrawn for cleaning it. The production speed of the said device greatly higher that of the above mentioned patent by Dennis due to the fact that the cylinders remain at a static position while only an alternate angular stroke of a slight valve body or chest typically of a plastic material. The accessibility of the areas to be cleaned is also significantly best. However, the existence of only one or two dosing cylinders still limits the production speed to moderated values.

The further application for a patent ES 200001136, also of this applicant, offers a series of improvements to the said valve chest which essentially consist in replacing the said through holes by a single incut having a space wider than that occupied by the said holes. The said incut carries a simplification of the dosing cylinder piston system which in the former model was a double piston with a first piston travelling within the dosing cylinder and a second piston travelling through the holes of the valve chest. This implies a significant improvement as for the mechanical simplification of the device although it has a little incidence as for the production speed.

OBJECTIVES OF THE INVENTION

An objective of the invention is to contribute with a device for portioning meat or another flowable food product, provided with means for adjusting the size of the portions and capable of a high productivity with a high frequency of portions exit.

Another objective of this invention is to contribute with a portioning device for meat or another flowable food product provided with means to make easy to clean the elements thereof exposed to the contact with the food product.

EXPLANATION OF THE INVENTION

These objectives are met, according to this invention, by providing a portioning device for flowable food product which includes multiple portioning cylinders, arranged in alternate first and second groups of raised cylinders, with its entrances at the lower part, forming two parallel rows at static locations. The said entrances of the cylinders of each group open at respective first and second chambers, each provided with respective inlet and outlet. The portioning cylinders are provided in their interior with respective pistons fixed at the end of corresponding rods. The device comprises means for distributing food product in order to alternately allow to feed the said first chamber and associated cylinders, opening the inlet and closing the outlet of the said first chamber and simultaneously emptying the said second chamber and associated cylinders, closing its inlet and opening its outlet and vice versa.

Control and synchronization means drive the device in order that at every moment one of the said chambers and associated cylinders are being filled with incoming food product, driven by a pump and moving theirs respective pistons a given length depending on the size of the portions to be obtained, while the other of the said chambers and the associated cylinders, are being emptied of the said portions of food product driven by the fluid dynamic drive of their respective pistons. The said fluid dynamic drive can be consecutively carried out for each single piston of one of the groups of cylinders to obtain consecutive portions having the size of a piston stroke or consecutively for successive sub-groups of a number of pistons submultiple of the total number of pistons at each group of cylinders, to obtain consecutive portions having multiple sizes of a piston stroke.

The pistons drives are synchronized to allow filling a group of cylinders within the same space of time when the other group is emptied. The said distributing means for the food product comprise an inlet valve and an outlet valve, both cylindrical, having an alternate angular rotation, driven in unison by means of a single driving element, while the piston of each portioning cylinder is driven by a fluid dynamic cylinder which according to an example of embodiment, comprises a fluid dynamic cylinder provided with a through rod with an end within the portioning cylinder bearing the piston and a free opposite end protruding from the head of the said fluid dynamic cylinder and according to another example of embodiment, it comprises an inlet at one end of each cylinder, distal from its entrance, for introducing a compressed fluid directly pushing a face of the piston opposite to its face contacting the food product, each piston being joined to an internal end of a piston, which has an external portion which protrudes from the cylinder and which ends at a free end. Stop means fixed on a moving plate having an adjustable height allow to determine in unison a length of working stroke being the same for every cylinder, abutting against the said free top ends of the respective rods. The piston stroke determines, as it is well-known, the size of the portions.

The consecutive emptying drive of the individual pistons or of sub-groups of pistons of the cylinders of a group while simultaneously the cylinders of another group are being filled, produces a "submachine gun effect" allowing a high productivity rate, with high output frequencies of, for example, and depending on the size of the portions, 100 portions of 200 mg per minute, or 60 portions of 800 g per minute, or 30 portions of 1,200 g per minute.

On the other hand, the set of the first and second groups of cylinders is arranged on a hinged plate with respect to a side of a base plate housing the said first and second chambers. The said hinging allows to tilt the said set of first and second groups of cylinders towards one side with which are exposed, on the one hand the entrances of the cylinders and the heads of their respective pistons and on the other hand the said first and second chambers with their associated ducts, making their cleaning easier. The pistons are joined to their respective rods with releasable fastening means so when the pistons are at the lower limit of their stroke they are easily withdrawn to provide an access to the internal recess of the cylinders. Means have been provided to fasten the rods at the said lower limit of their stroke in order to facilitate the pistons mounting and dismounting operations.

SHORT EXPLANATION OF THE DRAWINGS

The invention will be more apparent from following detailed description of an example of a preferred example of embodiment thereof, which description includes references to the drawings appended, in which:

FIG. 7 is an enlarged cross sectional part view of the device of FIG. 3 showing the area of the head of the portioning cylinders heads and the fastening means of the rods at their lower limit position;

FIG. 8 is the detail VIII of FIG. 4, enlarged, in which the head of one of the pistons is illustrated;

FIG. 9 is a bottom view of the head of the piston of FIG. 8;

DETAILED DESCRIPTION OF AN EXAMPLE OF EMBODIMENTS OF THE INVENTION

Figure 1:
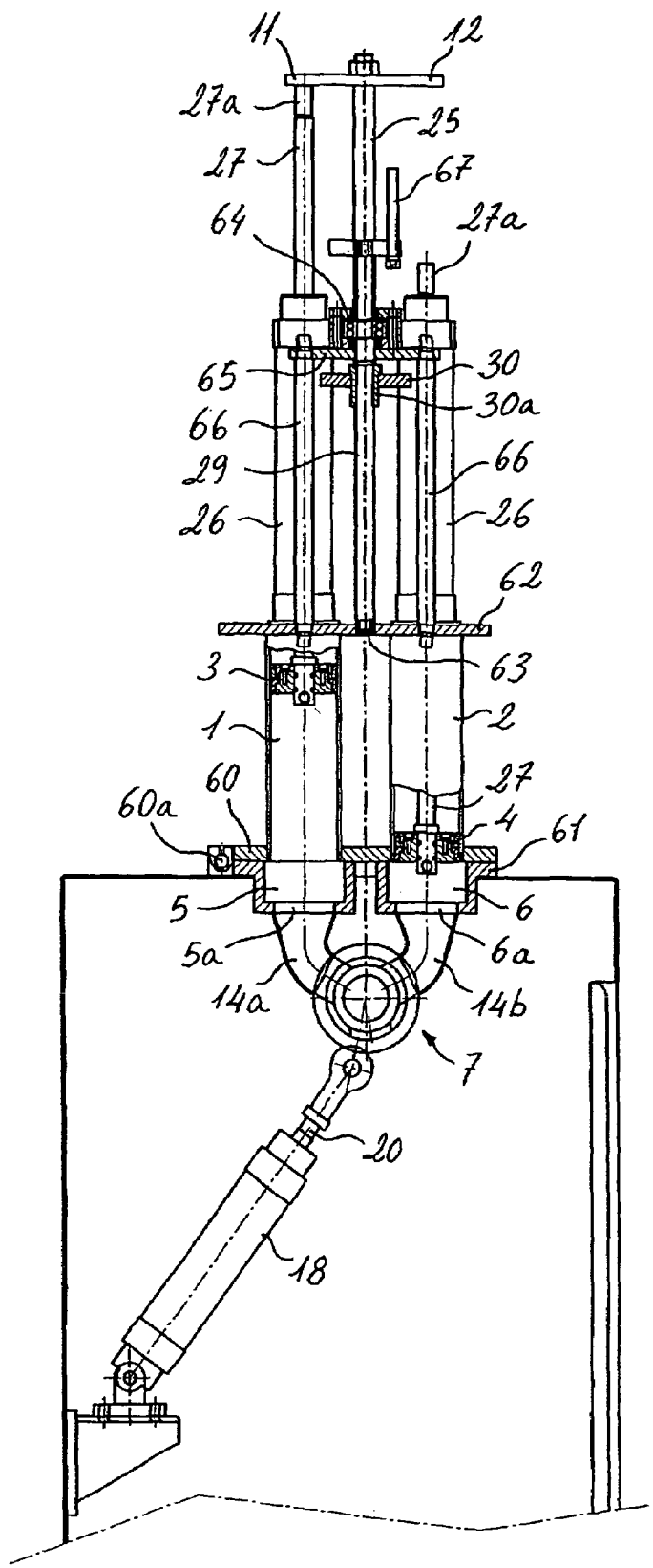
FIG. 1 is a cross sectional front part view taken through a plane at the middle area of the device according to an example of embodiment of this invention, where for best clarity some structural elements have been omitted.
Figure 2:
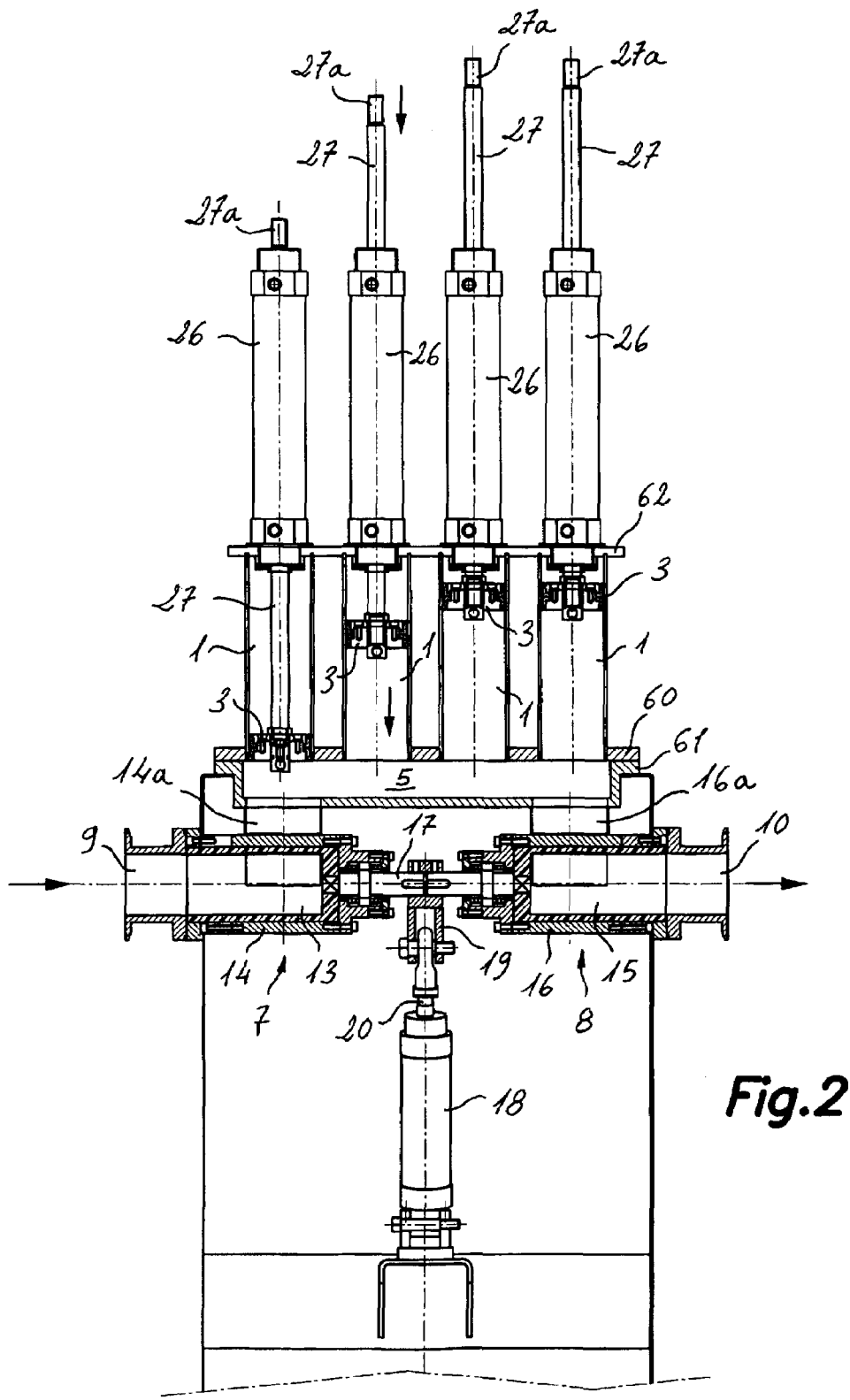
FIG. 2 is a longitudinal sectional side part view of the device of FIG. 1, of which for best clarity the stop system of the portioning cylinders stroke limit has been omitted.
Figure 3:
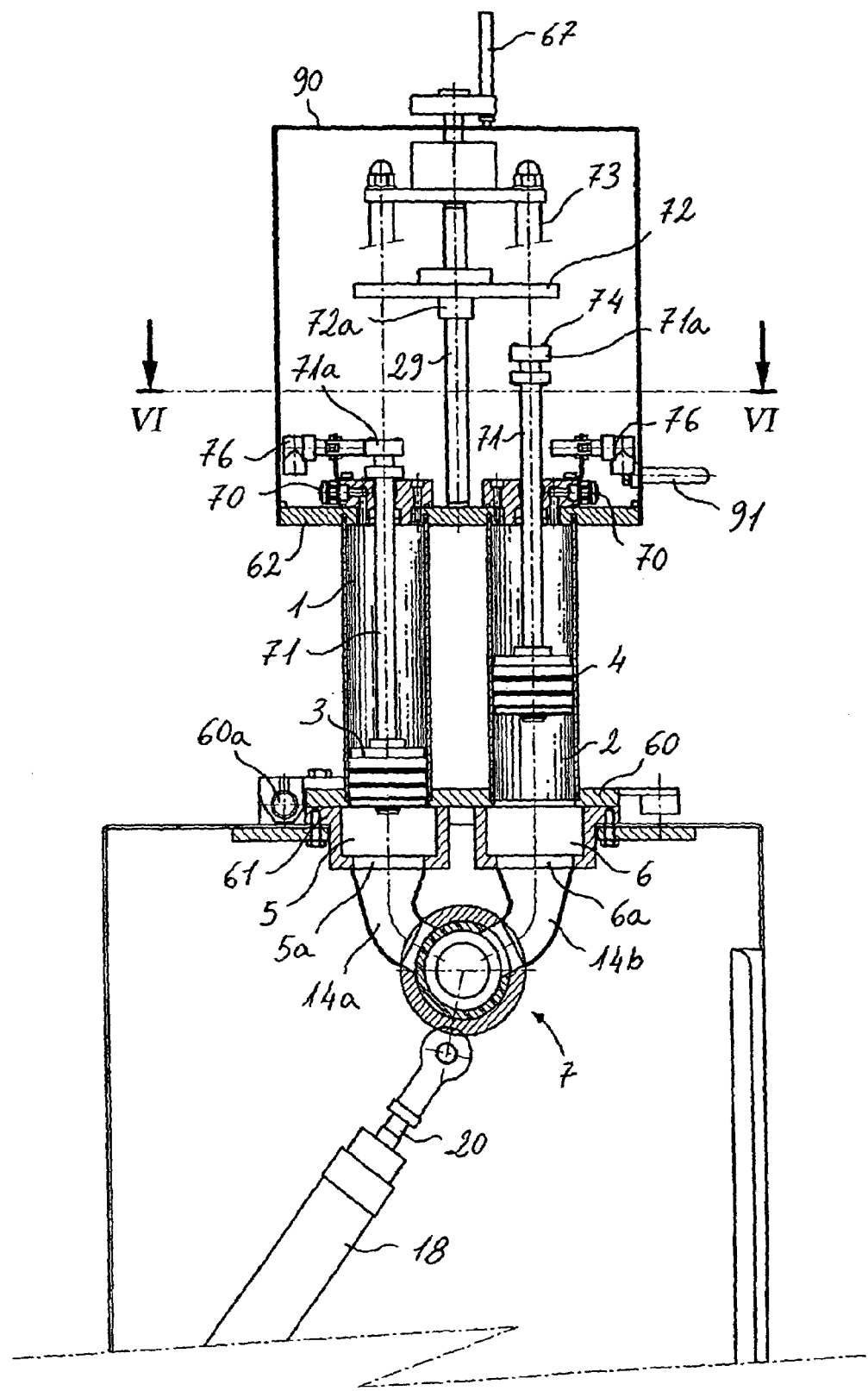
FIG. 3 is a cross sectional front part view taken through a plane at the middle area of the device according to another example of embodiment of this invention, in which for best clarity some structural elements and the fastening means of the rods at their lower limit position have been omitted.
Figure 4:
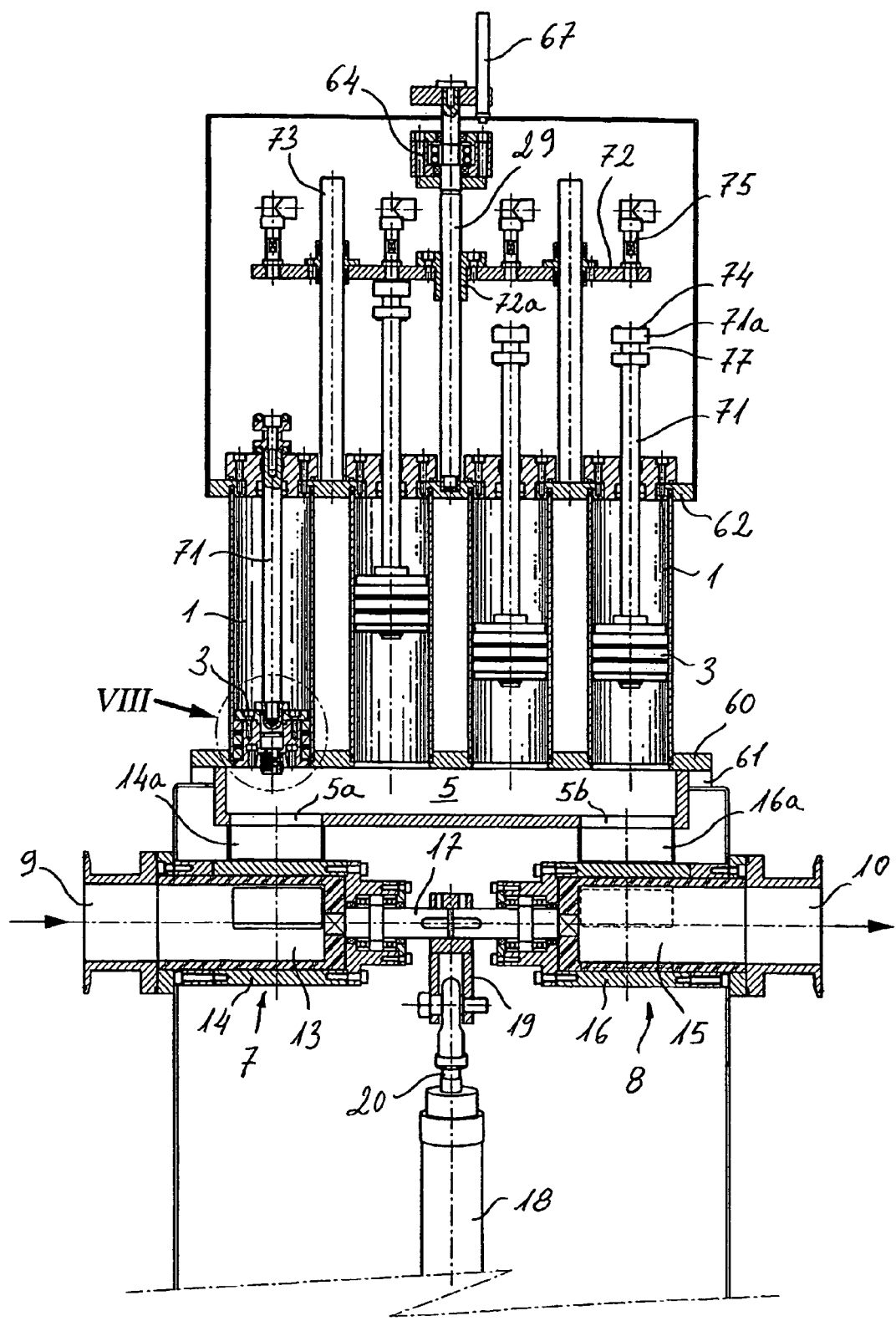
FIG. 4 is a longitudinal sectional side part view of the device of FIG. 3.
Figure 5:
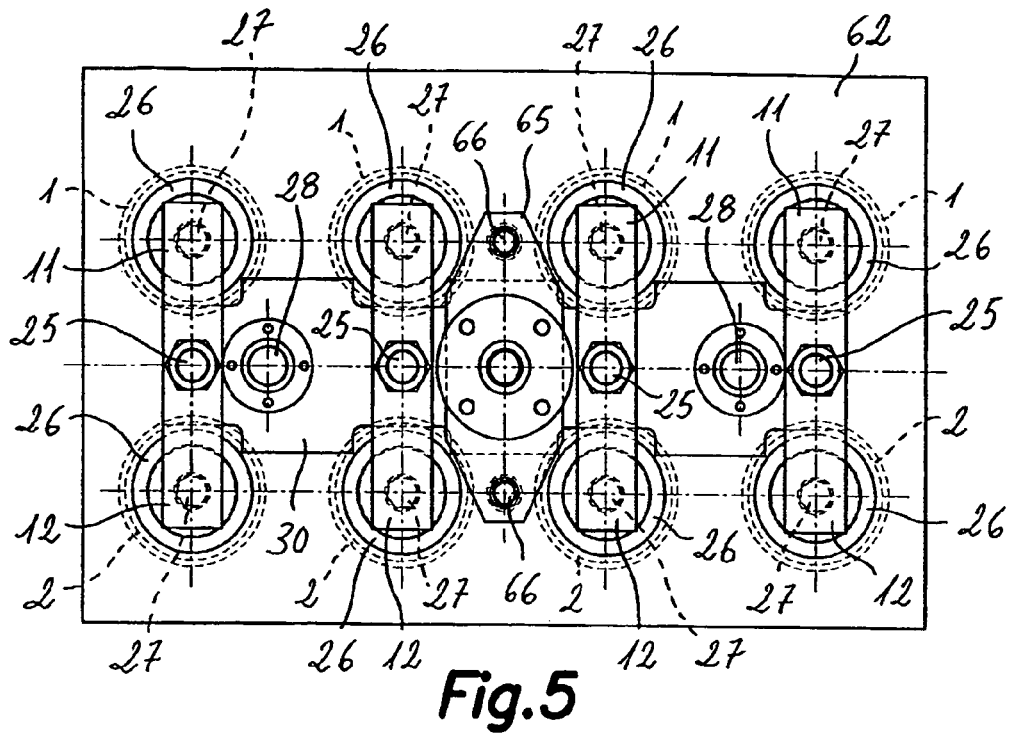
FIG. 5 is a top view of the set of portioning cylinders of FIGS. 1 and 2.

It is referred first to features which are common for the example of embodiment shown in FIGS. 1, 2 and 5 and the example of embodiment shown in FIGS. 3, 4 et 6. Thus, the portioning device for flowable food product according to this invention comprises a first group of cylinders formed by four cylinders 1 provided with respective pistons 3 and a second group of cylinders formed by four cylinders 2 provided with respective pistons 4. The cylinders 1, 2 of the said first and second groups are arranged in raised position forming two adjacent parallel rows, the cylinders 1 of the first group being communicated by their entrances with a first chamber 5 which has an inlet 5*a* and an outlet 5*b* while the cylinders 2 of the second group are communicated by their entrances with a second chamber 6, parallel and adjacent to the first, which has an inlet 6*a* and an outlet 6*b*. Under the said first and second chambers distributing means for the food product are arranged to alternately:

feed the said first chamber 5 and cylinder 1 associated, opening its inlet 5*a* and closing its outlet 5*b* and simultaneously empty the said second chamber 6 and cylinders 2 associated, closing its inlet 6*a* and opening its outlet 6*b*; and vice versa.

The device includes control and synchronization means in order that at every moment one of the said chambers, for example chamber 5 and cylinders 1 associated to it is being filled with incoming food product while the other of the said chambers, in this example of the chamber 6 and the cylinders 2 associated to them, are being emptied taking off the food product. The incoming food product is impelled by a pump through an inlet 9 and, as cylinders 1, 2 are being filled, it moves the respective pistons 3 a predetermined length depending on the size of the portions to be obtained. The outcoming food product is impelled by a fluid dynamic drive of the respective pistons 4 supplying a nonstop flow of portions through an outlet 10. The element and operation of the inlet and outlet valves 7,8 system is explained below with relation to FIG. 10 to 16B.

The configuration of the device and the programming of the control and synchronization means are designed in order that the filling time of the cylinders is equal to the emptying time to be able by virtue of the alternate filling/emptying of both groups of cylinders, supply at the outlet 10 a continuous flow of portions from a nonstop flow of food product supplied at the inlet 9. For this, the control and synchronization means control the fluid dynamic drive of the pistons 3, 4 of each group of cylinders 1, 2 consecutively for each individual piston 3, 4, so that at the outlet 10 consecutive portions are supplied, each having the size of a piston stroke or consecutively for successive subgroups of a number of pistons submultiple of the total number of pistons 3, 4 at each group of cylinders 1, 2, so that at the outlet 10 consecutive portions are supplied, each having a size multiple of a piston stroke.

By piston stroke it is meant here the volume swept by the piston within the cylinder along its working stroke. In other words, the volumetric size of a portion corresponds to the volume obtained by means of the product of the superficial area of the internal cross section of the cylinder by the length of the piston working stroke. As the cross section of the cylinder is constant, the size of the portion will be determined by the length of the said piston working stroke.

The device of the invention comprises adjustable means for determining the said piston stroke of the portioning cylinders as well as means to make easier cleaning the areas which during the operation are in contact with the food product.

Thus, the set of the first and second groups 1, 2 of cylinders is arranged on a plate 60 coupled by means of a hinge 60*a* with respect to a side of a base plate 61 (best shown at FIG. 10 to 12) which houses the said first and second chambers 5, 6. The said hinged coupling 60*a* allows to tilt the set of the said first and second groups 1, 2 of cylinders towards one side its internal recesses being thus exposed as well as the piston heads, at same time that the said first and second chambers 5, 6 are also exposed as well as their associated passageways and ducts making cleaning easier.

According to the example of embodiment of FIGS. 1, 2 and 5, for driving the pistons 3, 4, each of the said cylinders 1, 2 is coaxially connected by its top part with a respective fluid dynamic cylinder 26 provided with a through rod 27, with a lower end bearing the respective piston 3, 4 within each cylinder 1, 2 and a free top end 27*a* protruding at the head of the fluid dynamic cylinder 26. The set of all the fluid dynamic cylinders 26 is fastened on a structural plate 62 integral with the top ends of the first and the second groups of cylinders 1,2. The said means to regulate the piston strokes comprise stop elements in unison movable and fastenable stops which can act as stops of the free top ends 27*a* of the said rods 27 linked to the respective rods 3, 4 to stop their travel, limiting this way the stroke of all of them to the same length. These stop elements comprise parallel pillars 25 (see also FIG. 5), having topping T-shaped arms 11, 12, which are extending above the end areas 27*a* of the said rods 27. Preferably, the ends of the said arms 11, 12 have elastic stops. The said pillars 25 start perpendicularly from a plate 30 which is arranged crosswise to the development of the first and the second groups 1, 2 of cylinders. The said plate 30 is guided in columns 28, it has a nut 30*a* fixed linked to a central screw spindle 29 parallel to the said columns 28, for an upright travel of the said plate 30 parallel to itself. The said travel of the plate 30 carries the subsequent travel of the said pillars 25 together with the arms 11, 12 acting as stop elements, determining with it the top limit of the working stroke of all the rods 27 at same time and therefore the size of the portion to be obtained. For the purpose of supplying information to the control and synchronization means, at the said plate 30 detectors of top end of the stroke of the respective pistons 3, 4 are mounted which are associated to each of the said fluid dynamic cylinders 27.

The said screw spindle 29 is installed between a lower housing 63 on the plate 62 and a top bearing 64 mounted on a supporting plate 65 fixed with respect to the plate 62 by means of a pair of columns 66. The screw spindle 29 is hand rotated by means of a handle 67 (FIG. 1) to adjust the height of the stops 11, 12 although it could also be driven by means of, for example, an electric engine. Mounted on the said plate 30, there exists detectors of end of the stroke (not shown) which are associated to each of the said fluid dynamic cylinders 27.

Figure 6:
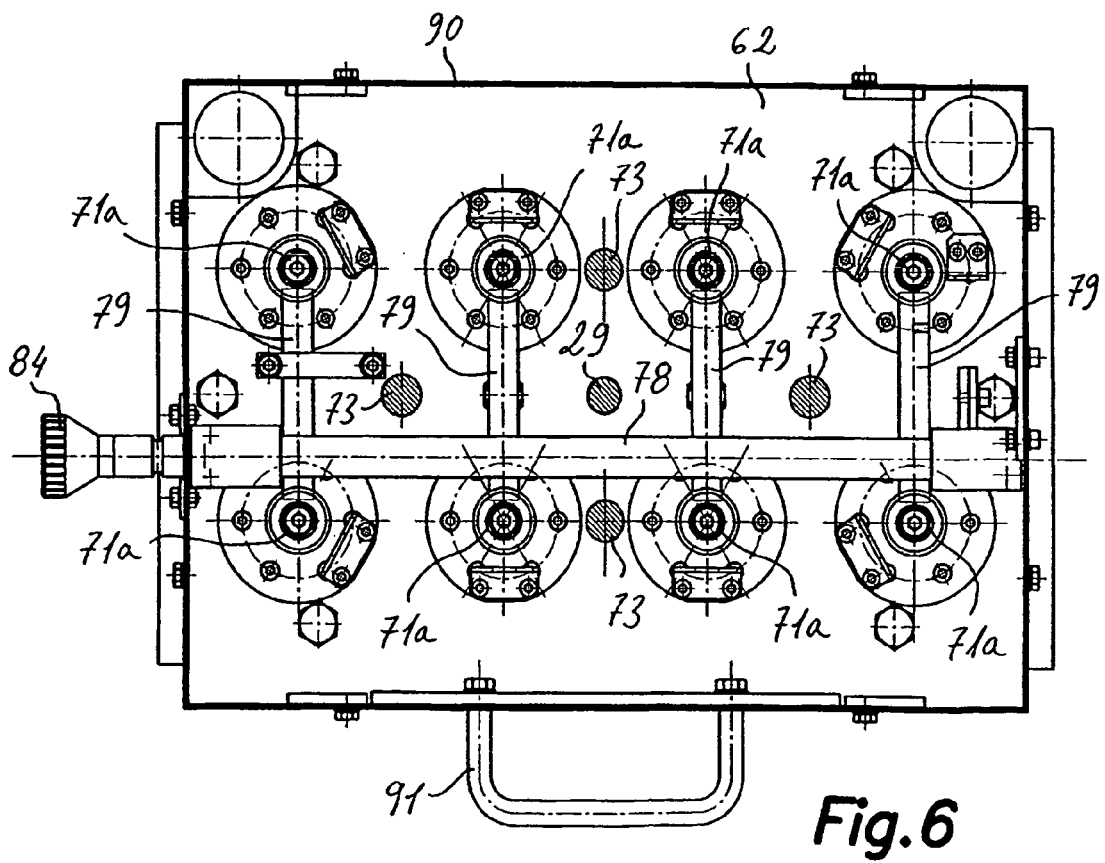
FIG. 6 is a cross sectional view taken through the plane VI—VI of FIG. 3.

In FIGS. 3, 4 and 6, an alternative example of embodiment for driving the pistons 3, 4 is illustrated. Here an inlet 70 of compressed fluid at the end of each cylinder 1, 2 has been arranged distal from its entrance. The said compressed fluid directly pushes against a face of the piston 3, 4 opposite to its face of contact with the food product. Each piston 3, 4 is joined to an internal end of a rod 71 which has an external portion which protrudes from the cylinder 1, 2 and which ends at a free end 71*a*. In this example of embodiment, the said means for adjusting the stroke of the pistons comprise stop elements which can be moved in unison and fastened in a position and capable of stopping the travel of the said rods 71 for limiting the stroke of all of them at same length.

As it is shown in FIGS. 6 and 7, these stop elements comprise a plate 72 which extends above the free ends 71*a* of the said rods 71. The plate 72 can uprightly move guided by columns 73 which start perpendicularly form the said structural plate 62. For driving it, the plate 72 is joined to a nut 72*a* linked to a central screw spindle 29. Preferably, at the free ends 71*a* of the rods 71 elastics stops 74 are arranged.

This example of embodiment of FIGS. 3, 4 and 6 comprises first detectors of end of stroke 75 mounted on the said plate 72 and second detectors of end of stroke 76 associated to the structural plate 62 to respectively detect the top and bottom limit positions of each free end 71*a* of the rods 71. At each free end 71*a* of the rods 71 a part is fixed which comprises a pair of flanges between which an annular slot 77 is defined. On the plate 62 a movable member 78 is slidably mounted on which a series of locking wings 79 are fixed corresponding one of the said locking wings 79 to each rod 71. The movable member 78 can slide within housings 83 and has an external end joined to a knob 84 by means of which the movable member 78 can be changed by hand from a first position at which the wings 79 are out of the slots 77, so that the rods 71 can freely move and a second position in which the wings 79 are within slots 77, the rods 71 being at the lower limit of their stroke so that the rods 71 are locked in the said lower position. In the example of embodiment of FIGS. 1, 2 and 5, the rods 27 can be fixed at their corresponding lower limit position by means of the fluid dynamic cylinders 26.

In the device of FIGS. 3, 4 and 6, a protecting housing 90 is shown for the external portions of the rods 71 and associated mechanisms, as well as a handle 91 to assist to support the whole assembly during its tilting with respect to the hinge 60*a*. Although they have not been shown, a similar housing and handle can be incorporated to the device of FIGS. 1, 2 and 5.

As illustrated in FIG. 8, each piston 3, 4 is fixed on its respective rod 71 by means of a releasable fastening device 80. Although other devices can be used for the said purpose, a plug quick locking device 80 as the one illustrated, which is provided with elastically loaded balls 85 which are locked within an annular slot 86 provided in a stub which protrudes from the piston 3, of the type of those used to carry out pneumatic and hydraulic connections. Although FIG. 8 refers to the example of the embodiment of FIGS. 3, 4 and 6, an analogous fastening device can be used for fixing the pistons 3, 4 to their respective rods in the example of embodiment of FIGS. 1, 2 and 5. Thus, when the set of cylinders 1, 2 and associated mechanisms, integral with the plate 60 is at an inclined position towards one side with respect to a lateral part of a base plate 61 by virtue of the said hinge 60*a*, the heads of the pistons 3, 4 can be easily and quickly released and withdrawn from the cylinders 1, 2 for their easy cleaning and for cleaning the internal recesses of the cylinders 1, 2. This operation, and namely the operation of fixing back the pistons to their respective rods 27, 71, results greatly easier if the said rods have been fixed at their lower limit position as above described.

In addition, the piston head 3, 4 optionally comprises a element 81 adapted to receive, when the rod 21, 71 is at the lower limit of its stroke and the fastening element 80 is released, a withdrawing tool 82 by means of which a force can be exerted by hand to withdraw the piston 3, 4 from related cylinder 1, 2. This element comprises a pair of cross strips 81 which starts (FIG. 9) at respective blind holes 81*a* provided in positions diametrally opposite to the piston face 3, 4 designed to contact the food product and they draw respective arches with respect to the centre of the piston until covering a predetermined angle. Obviously, on the ground of the same idea, the strips could draw other different paths. The cross sectional profile (F.8) of the said strips 81 has an enlarged internal portion 81*b*, having an amplitude similar to the diameter of the said blind holes 81*a*. Thus, a U-shaped tool 82, having suitable enlargements at the ends of their branches can be introduced through the holes 81*a* and then moved to the following path of the strips 81, in the example illustrated rotating the said predetermined angle up to the blind end of the strips. At the said position, the tool remains locked in the piston and can be used as a grab handle to apply a withdrawing force by hand.

Figure 10:
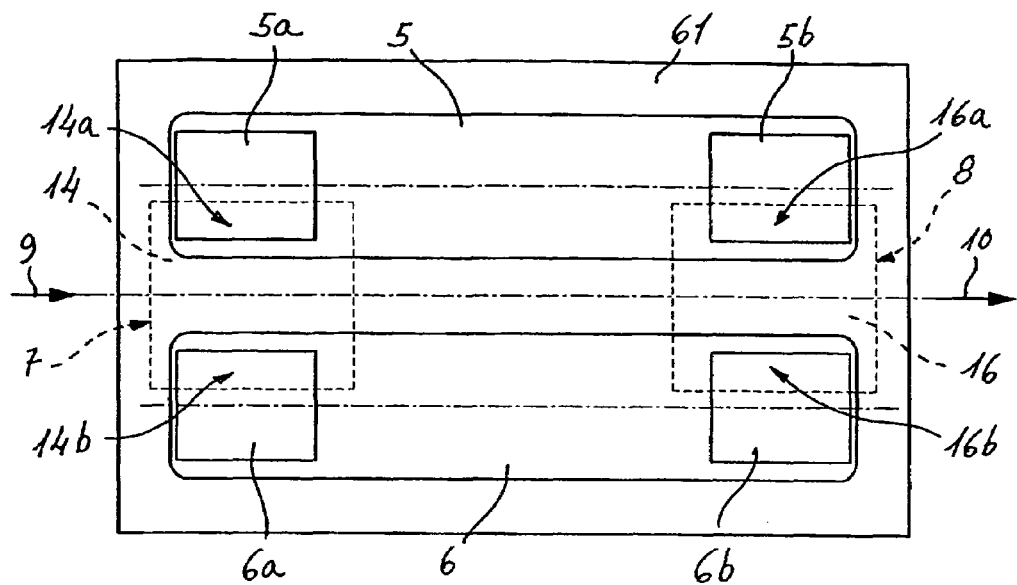
FIG. 10 is a top view of a set of common base plate for the devices of FIG. 1 to 6, the said base plate including the said first and second chambers, the housings of the inlet and outlet valves and the associated communication passageways.
Figure 11:
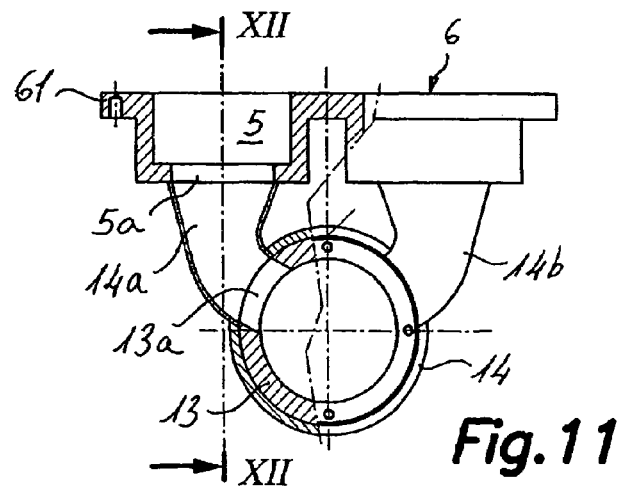
FIG. 11 is a partly sectional front view of the set of FIG. 10.
Figure 12:
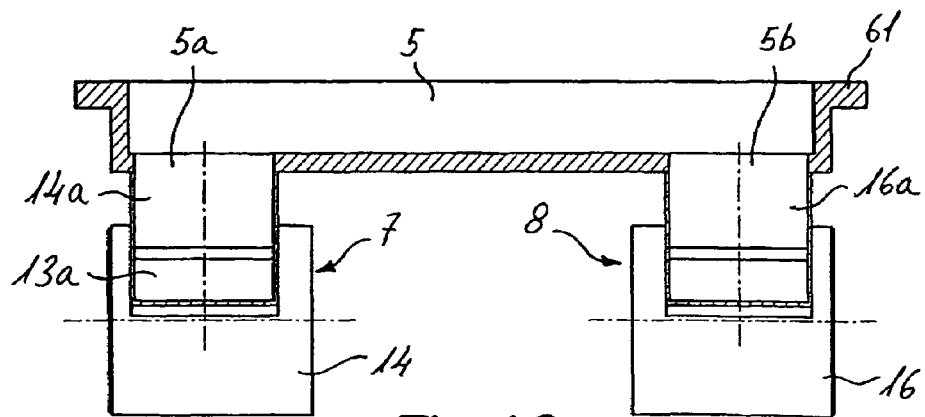
FIG. 12 is a longitudinal sectional view taken through the plane XII—XII of FIG. 11.

Referring now to FIG. 10 to 12, they show the set of the said distributing means which comprise the said inlet valve 7 and the said outlet valve 8. The said inlet and outlet valves 7 and 8 are alternately synchronously driven in order the first chamber 5 is only communicated with the said inlet 9 of food product when the second chamber 6 is only communicated with the said outlet 10 of food product portions and vice versa.

For this, the distributing means comprise a cylindric housing 14, for the inlet valve 7, which is axially communicated with the said inlet 9 of food product and radially with the said inlets 5*a*, 6*a* of chambers 5, 6 through corresponding passageways 14*a*, 14*b* and a cylindric housing 16 for the outlet valve 8, which is axially connected with the said outlet of food product portions and radially with the outlets 5*b*, 6*b* of chambers 5, 6 through respective passageways 16*a*, 16*b*. Within the said housings 14, 16 can tightly rotate respectively the inlet and outlet valves 7, 8, which have for this respective cylindric bodies 13, 15.

Figure 13:
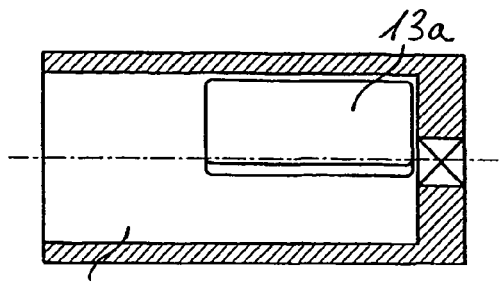
FIGS. 13 and 14 are longitudinal sectional views of the inlet and outlet valve bodies, respectively.
Figure 14:
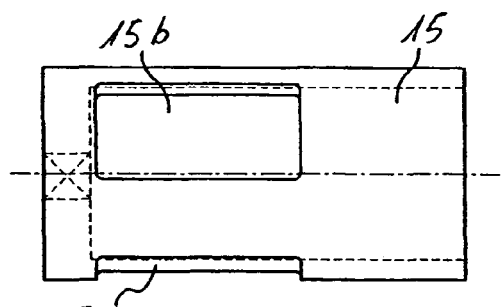

As it is best illustrated in FIG. 13, the said cylindric body or chest 13 of the inlet valve is hollow and is glass-like open by one end, the said open end remaining facing the inlet 9 of food product in operating arrangement. On its cylindric wall, the chest 13 has a port 13*a* opened which can alternately face one of the openings of the said passageways 14*a*, 14*b* arranged in the housing 14 depending on the angular position of the chest 13 within it. In a similar way, the cylindric chest 15 of the outlet valve is hollow (see FIG. 14) and is glass-like open at one end, the open end thereof is facing in operating arrangement the outlet 10 of portions of food product. On its cylindrical wall, the chest 15 has two ports opened, 15*a* and 15*b*, each being capable of alternately facing a respective outlet passageways 16*a*, 16*b* of the said chambers 5, 6, while the other remains closed by the housing wall 16 depending on the angular position of the chest 15 within the housing 16.

As shown in FIGS. 2 and 4, 10 and 12, the housings 14 and 16 are coaxial, and the bodies 13, 15 of the inlet and outlet valves 7, 8, respectively, are located in operating position with their respective ends open at opposite ends, that is to say, with their closed ends facing each other, which are connected to each other by an axial element 17 which can alternately carry out rotations having a controlled amplitude, in opposite directions. The axial element 17 is driven by a fluid dynamic device 18 the rod 20 of which is connected by its end to a fork 19 which derives from a cross member integral with a middle area of the said axial element 17. With this simple drive, the two valve chests 13, 15 of the inlet and outlet valves 7 and 8 area alternately rotated in unison in one and the other direction.

Figures 15A, 15B:
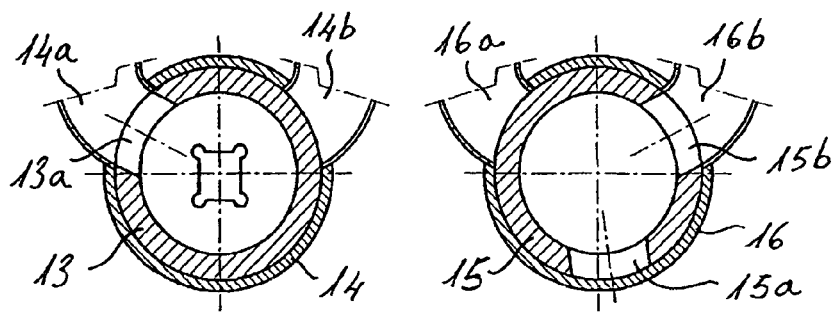
FIGS. 15A and 15B are cross sectional views of the inlet and outlet valve bodies, respectively, at a first position, or filling position of the cylinders.
Figures 16A, 16B:
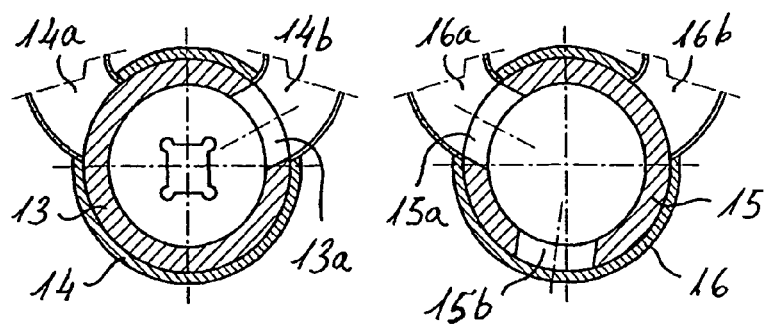
FIGS. 16A and 16B are cross sectional views of the inlet and outlet valve bodies, respectively, at a second position or emptying position of the cylinders.

In FIGS. 15A, 15B and 16A and 16B, the inlet and outlet valve chests 13, 15 are illustrated at their limit positions respectively. At a first limit position (FIGS. 15A, 15B), the port 13*a* of the inlet valve chest 13 it is, for example, facing the inlet passageway 14*a* of the chamber 5 (FIG. 15A), while the port 15*b* of the outlet valve chest 15 is facing the outlet passageway 16*b* of the chamber 6 (FIG. 15B). It must be noted that in this position the inlet passageways 14*b* to the chamber 6 remains closed by the cylindric wall of the valve chest 15 while the outlet passageways 16a of the chamber 5 remains closed by the cylindric wall of the valve chest 15 and the other port thereof remains closed by the cylindrical wall of the housing 16. At the second limit position (FIGS. 16A, 16B), both valve chests 13, 15 rotated a predetermined angle so that the port 13a of the inlet valve chest 13 is now facing the inlet passageway 14b of the chamber 6 (FIG. 16A) while the port 15a of the outlet valve chest 15 is facing the passageway 16a of the chamber 5 (FIG. 15B). It must be noted that at this second position, the inlet passageway 14a of the chamber 5 remains now closed by the cylindrical wall of the valve chest 13 while the outlet passageway 16b of the chamber 6 remains closed by the cylindrical wall of the valve chest 15 and the other port 15b thereof is closed by the cylindric wall of the housing 16.

Although above description of this invention has been done from specific examples of embodiment, they are only for not limiting illustration purpose of the scope of the invention which is defined in the appended claims.

I claim:

1. A device for portioning flowable food products comprising:
    a first group of cylinders (1) each provided with a respective piston (3) which can be moved toward a cylinder entrance by a fluid dynamic drive and communicated through said cylinder entrance with a first chamber (5) which has an inlet (5a) and an outlet (5b);
    a second group of cylinders (2), each provided with a respective piston (4) which can be moved toward a cylinder entrance by a fluid dynamic drive and communicated through said cylinder entrance with a second chamber (6), which has an inlet (6a) and an outlet (6b);
    at least a pump to impel said flowable food product through an inlet (9);
    distributing means (7, 8) for alternately communicating said inlet (9) with said inlet (5a) of said first chamber (5) while closing said outlet (5b) to allow filling said cylinders (1) with said flowable food product impelled by said pump to move said pistons (3) a predetermined stroke corresponding to a portion and simultaneously close said inlet (6a) of said second chamber (6) and communicate said outlet (6b) with an outlet (10) to allow emptying said cylinders (2) by a stroke of said pistons (4) under said fluid dynamic drive, in a direction opposite to that of said predetermined stroke and vice versa;
    means (11, 12) to delimit said predetermined stroke of said pistons (3, 4) under pressure of said pump, in order to accurately determine a size of said portion,
    driving means arranged to drive said distributing means (7, 8); and
    control and synchronisation means to control said distributing means (7, 8) and said fluid dynamic drive of said pistons (3, 4) so that when one of said groups of cylinders (1,2) associated to one of said chambers (5, 6) is being filled with food product, another of said groups of cylinders (1, 2) associated to a different of said chambers (5, 6) is being emptied of portions of food product,
wherein said fluid dynamic drive in each group of cylinders (1, 2) is produced consecutively for each single piston (3, 4) generating a submachine gun effect to supply at said outlet (10) consecutive portions having a size of a stroke of a piston, or consecutively for subgroups of said pistons (3,4) working simultaneously, providing at said outlet (10) consecutive portions having a size multiple of a stroke of a piston.

2. A device according to claim 1, characterized in that said distributing means (7, 8) comprise:
    an inlet valve (7) driven for alternately communicate said inlet (9) with inlets (5a, 6a) of said first and said second chambers (5, 6); and
    an outlet valve (8) driven for alternately communicate outlets (5b, 6b) of said first and said second chambers (5, 6) with said outlet (10),
wherein driving of both valves (7, 8) being synchronized in order that alternately said first chamber (5) is communicated with said inlet (9) when said second chamber (6) is communicated with said outlet (10) and vice versa.

3. A device according to claim 2, characterized in that said first and second chambers (5, 6) are adjacent and parallel to each other and said cylinders (1, 2) of each group are aligned along their respective chamber (5, 6).

4. A device according to claim 3, characterized in that
    said inlet valve (7) comprises a cylindrical hollow body (13) open at one end which can tightly rotate within a housing (14);
    said hollow body (13) is axially coupled by said open end with said inlet (9) for said food product and provides a radially communication through a port (13a) with a first or a second of said respective inlets (5a, 6a) of said chambers (5, 6) through respective passageways (14a, 14b) of said housing (14) depending on an angular position of said body (13) within it;
    said outlet valve (8) comprises a cylindrical hollow body (15) open at one end, which can tightly rotate within a housing (16); and
    said body (15) being coaxially coupled by said open end with said outlet (10) of food product portions and provides a radial communication through two ports (15a, 15b) with one or another of their respective outlets (5b, 6b) of said chambers (5, 6) through passageways (16a, 16b) of said housing (16) depending on an angular position of said body (15) within it.

5. A device according claim 4, characterized in that
    said housings (14) and (16) are coaxial;
    said bodies (13, 15) of said two inlet and outlet valves (7, 8) are arranged with closed ends facing and connected to each other by an axial element (17) linked to a fluid dynamic device (18), that when drived provides unison alternate rotations of said axial element (17) and bodies (13,15); and
    said unison alternate rotations having a controlled amplitude in opposite directions between a first and second positions in which:
        said port (13a) of said body (13) of said inlet valve (7) faces alternatively a first or a second of said two inlet passageways (14a, 14b) while the other of said passageways (14a, 14b) remains closed by a cylindrical wall of said body (13); and
        a first or a second of said two ports (15a, 15b) of said body (15) of said outlet valve (8) faces alternatively a first or a second of said outlet passageways (16a, 16b) of said chambers (5, 6), the other passageway (16a, 16b) remaining closed by said cylindrical wall of said body (15) while the other of said two ports (15a, 15b) remains closed by said housing wall (16).

6. A device, according to claim 5, characterized in that said axial element (17) for connecting between said valves (7, 8) has built in a radial member from which a fork (19) overhang to which an end of a rod (20) of a fluid dynamic cylinder (18) is connected.

7. A device, according to claim 3, characterized in that
a set of first and second groups (1, 2) of cylinders is arranged on a plate (60) coupled by a hinge (60a) with respect of a side of a base plate (61) housing said first and second chambers (5, 6);
said hinge coupling of said plate (60) allowing to tilt said first and second groups of cylinders (1, 2) towards one side so its internal recesses are thus exposed as well as said pistons (3, 4), at same time that said first and second chambers (5, 6) are also exposed as well as their associated passageways making cleaning easier.

8. A device, according to claim 7, characterized in that
said fluid dynamic drive of said pistons (3, 4) comprises a fluid dynamic cylinder (26) coaxially connected to each of said cylinders (1, 2);
each of said fluid dynamic cylinders (26) being provided with a through rod (27), with a portion thereof located inside said respective cylinder (1, 2) and attached at its end to said piston (3, 4) and another portion of said rod (27) placed outside, protruding from a head of said fluid dynamic cylinder (26) and having a free end (27a); and
all said fluid dynamic cylinders (26) being fixed on a structural plate (62) integral with top ends of said first and second groups (1, 2) of cylinders.

9. A device, according to claim 8, characterized in that said means to adjust said stroke of said pistons comprises stop elements which can be moved and fixed at their position in unison, said stop elements being capable of stopping said travel of said rods (27) to which are joined said pistons (3, 4) to limit a stroke of all of them a same length.

10. A device, according to claim 9, characterized in that said stop elements comprise parallel pillars (25) T-shaped at a top part and defining arms (11, 12) extending above end areas (27a) of said rods (27) linked to respective pistons, said arms (11, 12) having at their ends elastic stops.

11. A device, according to claim 10, characterized in that said pillars (25) perpendicularly start from a plate (30) which is arranged crosswise a development of said first and second groups (1, 2) of cylinders and which is displaceable along guiding columns (28) and are joined to a nut (30a) linked to a central spindle (29) parallel to said columns (28) for a travel of said plate (30) parallel to itself.

12. A device, according to claim 11, characterized in that mounted on said plate (30) there exists detectors of end of said stroke associated to each of said fluid dynamic cylinders (27).

13. A device, according to claim 7, characterized in that said fluid dynamic drive of said pistons (3, 4) comprises an inlet (70) for said compressed fluid at one end of each cylinder (1, 2) distal from its entrance, said compressed fluid directly pushes against a face of said piston (3, 4) opposite to its face contacting with said food product, each piston (3, 4) being joined to an internal end of a rod (71) which has an external portion which protrudes from said cylinder (1, 2) and which ends at a free end (71a).

14. A device, according to claim 13, characterized in that said means for regulating said stroke of said pistons (3,4) comprises stop elements which can be moved and fixed in a position in unison, said stop elements being capable to stop travel of said rods (71) to which said pistons (3, 4) are joined to limit a stroke of all of them to the same length.

15. A device, according to claim 14, characterized in that said stop elements comprise a plate (72) which extends above free ends (71a) of said rods (71) said plate (72) being linked to a nut (72a) linked to a central screw spindle (29) and guided by columns (73) which start perpendicularly from said structural plate (62) for a travel of said plate (72) parallel to itself, elastic stops (74) being provided at said free ends (71a).

16. A device, according to claim 15, characterized in that it comprises first detectors of end of stroke (75) mounted on said plate (72) and second detectors of end of stroke (76) associated to said structural plate (62) to detect respectively a top and a bottom limit positions of each free end (71a) of said rods (71).

17. A device, according to claim 15, characterized in that each free end (71a) of said rods (71) comprises a pair of flanges between which an annular slot (77) is defined, a moveable member (78) being mounted on said plate (62) to which member locking wings (79) one for each rod (71) are fixed, said moveable member (78) of which can be changed between a first position in which said wings (79) are out of said slots (77), so said rods (71) can freely move and a second position in which said wings (79) are within said slots (77) said rods (71) being at a lower limit of their stroke so that said rods (71) are locked at said position.

18. A device, according to claim 8 or 17, characterized in that each piston (3, 4) is fixed on its respective rod (27, 71) by means of a releasable fastening device (80) and comprises an element (81) adapted to receive, when said rod (21,71) is at a lower limit of its stroke, a withdrawing tool (82) by means of which a force can be exerted by hand to withdraw said piston (3, 4) of the related cylinder (1, 2).

\* \* \* \* \*